United States Patent Office
3,769,199
Patented Oct. 30, 1973

3,769,199
PROCESS FOR SEPARATING WAXY HYDROCARBONS
Aleksander Jerzy Groszek, London, and Douglas Keith Nicholas, Hampton, England, assignors to The British Petroleum Company Limited, London, England
No Drawing. Original application Feb. 17, 1969, Ser. No. 799,885, now abandoned. Divided and this application June 23, 1971, Ser. No. 156,073
Claims priority, application Great Britain, Feb. 20, 1968, 8,174/68, 8,176/68
Int. Cl. C10g 43/04
U.S. Cl. 208—28          16 Claims

ABSTRACT OF THE DISCLOSURE

Waxy hydrocarbons are adsorbed from petroleum oils boiling above 30° C. using as adsorbent a graphic carbon prepared by the partial oxidation of a hydrocarbon so that not more than 10% of the carbon is released as elemental carbon, the graphitic carbon having a ratio of heat of adsorption of n-dotriacontane from n-heptane to the heat of adsorption of n-butanol from n-heptane of at least 3.5:1 and a heat of adsorption of n-dotriacontane of at least 1 calorie per gram.

---

This is a division of application Ser. No. 799,885, filed Feb. 17, 1969, now abandoned, and this invention relates to a carbon product, more particularly it relates to a carbon product having a large surface area.

It is known to prepare carbon in a finely divided form by the decomposition of hydrocarbons, and the products obtained are known generally as carbon blacks. Carbon blacks have a very high surface area and strongly and indiscriminately adsorb a wide variety of liquids and gases.

We have now found that it is possible to prepare a carbon product which possesses selective adsorption properties. According to the invention there is provided a substantially nonhydrophilic graphitic carbon having a surface area of at least 170 square metres per gram and a ratio of heat of adsorption of n-dotriacontane from n-heptane to heat of adsorption of n-butanol from n-heptane of at least 3.5:1 and a heat of adsorption of n-dotriacontane from n-heptane of at least 1 calorie per gram.

The surface area of the graphitic carbon is preferably at least 600 square metres per gram, and most preferably at least 100 square metres per gram.

Preferably the graphitic carbon has a heat of adsorption of n-dotriacontaine from n-heptane of at least 2.0 calories per gram and more preferably at least 3 calories per gram. Preferably the ratio of heat of adsorption of n-dotriacontaine from n-heptane to the ratio of n-butanol from n-heptane is at least 5:1.

By substantially non-hydrophilic is meant that the graphitic carbon has little affinity for water, and it is difficult to wet with water. When the graphitic carbon is shaken with distilled water there is a marked tendency for the graphitic carbon to separate out after shaking has ceased.

Preferably the graphitic carbon is substantially free from water and from volatile components. By volatile components is meant compounds having an initial boiling point of below 350° C. preferably below 300° C.

The volatile components can be removed by heating the contaminated graphitic carbon to at least 300° C. preferably at least 350° C. under normal pressure. Alternatively the volatile compounds can be removed by heating under reduced pressure, e.g. below 1 mm. of mercury at above 50° C., preferably above 100° C.

The invention also provides a method of preparing a graphitic carbon which comprises partially burning a hydrocarbon in oxygen or an oxygen containing gas at an elevated temperature so that no more than 10% by weight of the carbon in the hydrocarbon is released as elemental carbon and treating the products of the combustion to separate therefrom a carbonaceous product and recovering a carbon which is substantially non-hydrophilic and which has a surface area of at least 170 square metres per gram and a ratio of heat of adsorption of n-dotriacontane from n-heptane to the heat of adsorption of n-butanol from n-heptane of at least 3.5:1 and a heat of adsorption of n-dotriacontaine from n-heptane of at least 1 calorie per gram.

Preferably, the normalized oxygen to hydrocarbon ratio is from 0.5 to 1.5 more preferably 0.9 to 1.0, and the reaction takes place at above 1000° C. and more preferably at above 1250° C. The reaction preferably takes place at an elevated pressure preferably of above 100 pounds per square inch gauge and more preferably above 200 pounds per square inch, preferably the pressure is in the range of 200 to 700 pounds/square inch gauge. Preferably, steam is present in an amount sufficient to give a steam/hydrocarbon weight ratio of up to 2:1. Substantially pure oxygen is preferably used though oxygen diluted with other gases may be used as the combustion gas.

The separation of the graphitic carbon from the products formed by the partial combustion is preferably carried out by passing the products through water scrubbers to wash out the carbonaceous material. This process forms a rather unstable water slurry of the carbonaceous material.

The water can be separated from the slurry either by heating, preferably under redued pressure or by addition of a hydrocarbon for which the graphitic carbon has a very much greater affinity. When the oil is added a graphitic carbon/oil slurry is preferably formed which is readily removed from the water phase present and which takes virtually all the graphitic product with it. Also the water/carbonaceous material slurry can be contacted with a lighter hydrocarbon to separate it from the water and then contacted with a high molecular weight hydrocarbon.

The graphitic carbon/oil slurry has the excess and interstitial oil removed from it to give a dry product which comprises the graphitic carbon and adsorbed oil.

In order to remove the oil from this dry product it is preferably heated with a solvent for the oil. Suitable solvents include hydrocarbons such as paraffins, e.g. hexane, aromatic compounds e.g. benzene and toluene and alcohols, e.g. methanol and ethanol. The properties of the graphitic carbon thus obtained and the graphitic carbon obtained by removal of the water from the water/graphitic carbon slurry by heating can be enhanced by subsequent treatment stages. Preferably the graphitic product is heated under reduced pressure, e.g. below 1 mm. Hg to a high temperature, preferably the temperature is above 250° C., more preferably above 350° C. and most preferably above 500° C. After heating under reduced pressure the graphitic carbon can then be heated in a stream of hydrogen at an elevated temperature, the temperature used preferably being the same or higher than that used when the graphitic carbon is heated under reduced pressure.

By virtue of the method of preparation it is possible to obtain a graphitic carbon of less than 0.1% by weight and preferably less than 0.05% by weight sulphur content.

By elemental carbon is meant carbon not chemically combined with any other element i.e. excluding carbon in hydrocarbons such as methane, carbon dioxide, carbon monoxide and COS.

Preferably, not more than 5% by weight of the carbon in the hydrocarbon is released as elemental carbon, more preferably from 0.5–2.5% by weight is released as elemental carbon and most preferably from 1–2% by weight is released as elemental carbon.

The amount of carbon released as elemental carbon can be readily controlled by the ratio of oxygen to hydrocarbon and the temperature of the reaction.

The heats of adsorption of n-dotriacontane and n-butanol can be measured using a Flow Micro-calorimeter as described in Chemistry and Industry, Mar. 20, 1965, pp. 482–489.

The graphitic product of our invention is composed of particles which are predominately oleophilic and non-polar. Carbon blacks consist of non-graphitic particles having predominately polar surface, but showing also a degree of oleophilic properties.

The graphitic product of the present invention differs from carbon blacks and other forms of carbon in that it preferentially adsorbs long chain paraffinic hydrocarbons to a much greater extent.

It is thought that the reason for the adsorptive properties of the carbon product of our invention lies in the nature of the surface of the graphite crystallites. Graphite crystallites are thought to possess two different types of "sites," referred to hereinafter as "oleophilic sites" and "polar sites." The oleophilic sites are present on the basal plane area of graphite crystals and the polar sites are present on the edge area of graphite crystals. The oleophilic sites adsorb preferentially long chain n-paraffinic hydrocarbons, and the polar sites adsorb polar compounds, the two types of adsorption being essentially independent. In order to obtain a product which will adsorb long chain paraffinic hydrocarbons in preference to polar compounds it is important that the proportion of basal plane sites be as large as possible. In conventional grinding techniques the graphite is broken down in two directions and both edge areas and basal plane areas are formed.

The degree of adsorption of long chain paraffins can also be measured by measuring the actual weight of adsorbed paraffin, and the carbon product of our invention preferably has a specific adsorption of n-dotriacontane of at least 100 milligrams per gram and more preferably of at least 220 milligrams per gram.

In the partial combustion process the main gaseous products are hydrogen and carbon monoxide, but some methane, carbon dioxide and COS is formed and argon and nitrogen are also present.

The carbon product of our invention has the property of thickening greases as described in co-pending U.K. patent application 8,174/68 and it is surprising that as little as 3.0% by weight, based on the grease composition, of the graphitic carbon product can thicken a mineral base oil to a grease.

According to another aspect of the invention there is provided a process for the separation of aromatic and normal paraffin hydrocarbons from their mixtures with other hydrocarbons.

Our copending British patent application No. 39,140/64, Ser. No. 1,126,482, describes and claims a method of separating long-chain normal paraffin hydrocarbons having at least 10 carbon atoms per molecule from their mixtures with other hydrocarbons which comprises contacting the mixture with graphite having a surface area of at least 50 m.$^2$/gm. so as to adsorb selectively the normal hydrocarbons.

This copending application states that its preferable that the separation is carried out in the presence of a solvent which is lower boiling than the feed stock, such as benzene, n-heptane, iso-octane, ethanol or petroleum ether. Subsequent desorption of the selectively adsorbed hydrocarbons from the graphite may be effected by any of the customary methods, including flushing with a solvent.

By a suitable choice of solvents for adsorption and desorption it is possible to separate both n-paraffins and aromatic hydrocarbons from their mixtures with other hydrocarbons. In addition to the choice of solvents other factors which may affect the nature and extent of separation are the temperatures of adsorption and desorption and the nature of the graphite adsorbent.

The graphitic material prepared as previously described by the combustion of hydrocarbons in oxygen or an oxygen-containing gas is suitable as a selective adsorbent for separating long chain normal paraffin hydrocarbons and aromatic hydrocarbons from their mixtures with other hydrocarbons.

The separation process comprises contacting a mixture comprising components selected from aromatic hydrocarbons and normal paraffin hydrocarbons having at least 4 carbon atoms per molecule with a graphitic material and removing unadsorbed material from the graphitic material, said graphitic material having a surface area measured by nitrogen adsorption of at least 170 square metres per gram and a ratio of heat of adsorption of n-dotriacontane from n-heptane to the heat of adsorption of n-butanol from n-heptane of at least 3.5:1 and a heat of adsorption of n-dotriacontane from n-heptane of at least 1 calorie per gram.

Preferably, the graphite has a heat of adsorption of n-dotriacontane from n-heptane of at least 1.5 calories per gram and most preferably it has a heat of adsorption of at least 3 calories per gram. The heat of adsorption of n-dotriacontane from n-heptane can be as high as 7.5 calories per gram or even higher in particularly preferred products.

Adsorption can be measured by measuring the actual weight of adsorbed paraffin, and the graphite used in the process of our invention preferably has a specific adsorption of n-dotriacontane of at least 180 milligrams per gram and more preferably of at least 220 milligrams per gram.

The graphites have a surface area of at least 170 square metres per gram and preferably have a surface area of at least 350 square metres per gram.

The feed mixture for the process is preferably a petroleum fraction boiling above 30° C., particularly a fraction in the waxy distillate boiling range i.e. 300 to 700° C. The feed may be a straight run fraction or a waxy raffinate obtained after a selective solvent treatment with e.g. furfural to remove aromatics. The process is thus particularly suitable for dewaxing distillate lubricating oil fractions, for example the waxy raffinate used in the production of 65/100, 160/95 and 620/95 grades of lubricating oil, but may also be used in the treatment of bright stocks, and waxy distillates.

The adsorption and desorption stages of the process of the invention are preferably carried out in the presence of liquids in which the adsorbed and subsequently desorbed components are soluble. These liquids may be the same or different. Thus, the liquid carrying the graphite may comprise a single paraffin hydrocarbon, such as n-heptane or iso-octane, or it may comprise a mixture of hydrocarbons including refinery streams such as Primary Flash Distillate or an aromatic or alcoholic solvent may be used. The solvent used will depend on the materials to be adsorbed from the mixture on to the graphite. Non-polar solvents tend to promote the adsorption of aromatic hydrocarbons, whereas polar solvents promote the adsorption of non-polar compounds, such as waxes, including long chain n-paraffins. An aromatic or alcoholic solvent may comprise one or more compounds.

The adsorption stage of the process of the invention may be performed at a temperature of from −50° C. to 200° C. If a mixture of paraffins, aromatics, or alcohols is used its boiling range should be within this range. Hydrocarbons whose atmospheric boiling point is outside this range may be used at sufficient pressure to achieve a boiling point within the range quoted, provided that the desorption temperature is not above the critical temperature. Thus, for example, liquified propane and butane (L.P.G.) may be used under certain conditions. It is desirable that a hydrocarbon solvent having 4 or 5 carbon atoms per molecule should be used where it is required to adsorb normal paraffin hydrocarbons having from 4 to 10 carbon atoms per molecule. Suitable solvents in these circumstances would be iso-pentane, iso-butane, liquified ethane or liquified ethylene. However, iso-octane may also be used.

The loading of the graphite with the adsorbed components will depend on the nature of the feed, but should desirably be as low as possible. The loading is preferably less than 200% wt. by wt. of the graphite, and more preferably less than 100% wt. The ratio of adsorbed components to graphite may, however, be as high as 100:1. The loading of the graphite per pass should be desirably from 10 to 200% wt. of the weight of the graphite, and particularly from 20–100% wt. Loading within these limits in a cyclic operation results in no detectable change in separation efficiency after repeated cycles. The feed/solvent ratio should preferably be from 1 to 50% by wt. and the solvent flowrate in a cyclic operation should preferably be from 1 to 2000 mls./hr./100 gms. graphite. The contact time of the graphite with the feed may be from 1 to 120 minutes. The adsorption of n-paraffins is promoted by low temperatures within the stated range, and the preferential adsorption of aromatics by higher temperatures. Thus, the temperature should not be above 100° C. and preferably from 0 to 50° C. if it is desired to adsorb paraffins. The temperature may be above 30° C., and preferably from 50 to 200° C. where aromatics are to be adsorbed.

The adsorbed hydrocarbons may be recovered from the graphite by contacting it with a liquid which may be the same as that of the adsorption stage, or a chemically identical or different liquid may be used. The use of the same solvent is preferred. Desorption may be carried out at a temperature of from 50° C. to 400° C.

Aromatics are desorbed at higher temperatures than paraffins within the range specified for desorption. If the temperature is increased materials other than aromatics are desorbed. By choice of solvent and desorbing temperature, therefore, the nature of the material desorbed may be controlled. The temperature of desorption should not be outside the range 100–350° C. if an aromatic solvent or alcohol is used for desorption. The pressure at which desorption is carried out should be such as to maintain the eluting material in the liquid state and will accordingly be within the range 10 to 3000 p.s.i.g. It will of course be determined by the vapour pressure of the eluting material at the desorption temperature. The contact time will be within the range 1 to 120 minutes. The solvent/desorbate ratio is preferably from 1:1 to 100:1.

The method is desirably carried out in a cyclic type of operation, for example, by percolating the feed mixture together with liquid through a bed of graphite, removing non-adsorbed feed material and liquid from the bed, stripping the liquid from the non-adsorbed feed material, desorbing the adsorbed material from the graphite with the liquid, removing the desorbed material and liquid from the bed, stripping liquid from the desorbed material, and recontacting the graphite with the feed mixture. In such a fixed bed type of operation reaction conditions, in particular liquid flow rate, should be chosen so that the pressure drop across the bed is not excessive. Alternatively, a moving bed technique may be used in which the graphite is used in the form of a slurry in the hydrocarbon liquid. For large scale separation a moving bed system is preferred, since it offers savings in hydrocarbon liquid usage compared to a fixed bed system, particularly if the graphite and the hydrocarbon liquid move counter-currently. Single or multi-stage processes may be used.

In the case of preparation of lubricating oil base-stocks, the feedstock may be treated by any number of adsorption/desorption cycles to give a desired pour-point and viscosity index. The pour-point of the treated material will decrease as the extent of removal of adsorbed materials increases, but the yield will also decrease. Fractions treated by the process of the invention have in general higher viscosity indexes, lower cloud and pour points and lower sulphur contents than fractions obtained by conventionally treating similar feedstocks. They also have higher resistance to oxygen attack. In addition to the oil products obtained, the adsorbed and subsequently desorbed material, i.e. normal paraffins and/or aromatic materials may be of use, particularly if it is waxy paraffinic or aromatic hydrocarbon material.

EXAMPLE 1

A residual oil was reacted in the presence of steam and pure $O_2$ at a temperature of 1500° C. under a pressure of 350 p.s.i.g., and a reaction took place. The gaseous product formed consisted of 90% carbon monoxide and hydrogen, but methane, hydrogen sulphide, carbon dioxide and COS, argon and nitrogen were also present and suspended carbonaceous material. The gaseous product was then washed with water to form a carbon/water slurry.

The amount of carbon produced was about 1.5% by weight based on the hydrocarbon feed.

The excess water was removed from the slurry and the water extracted to leave the graphitic carbon. The graphitic carbon was subjected to a three stage treatment, in stage 1 the graphitic carbon was dried by heating to 50° C. in a vacuum, in stage 2 this dried graphitic carbon was heated to 550° C. in a vacuum and in stage 3 it was heated to 600° C. in a stream of hydrogen. After each stage the heat of adsorption of n-dotriacontane and n-butanol was measured and the amount of graphitic carbon surface indicated thereby calculated. This sample of graphitic carbon is referred to as sample A.

This was repeated with different samples of the graphitic product for which the BET surface area by nitrogen adsorption was known. These samples are referred to as graphitic carbons $A_1$ and $A_2$ respectively.

The results are shown below in Table 1.

The BET surface area measurements are obtained using nitrogen adsorption.

TABLE 1

|  | BET surface area, m.²/grams | Heat of adsorption of $nC_{32}$ from n-heptane and surface area calculated therefrom | | Heat of adsorption of n-butanol from n-heptane and surface area calculated therefrom | | Ratio [1] |
|---|---|---|---|---|---|---|
|  |  | Heat of ads., cals./grams | Surface area, m.²/grams | Heat of ads., cals./grams | Surface area, m.²/grams |  |
| Graphitic carbon $A_1$ after: |  |  |  |  |  |  |
| Stage 1 |  | 3.98 | 362 | 0.65 | 31.3 | 6.1 |
| Stage 2 |  | 6.17 | 550 | 0.85 | 40.8 | 7.2 |
| Stage 3 |  | 6.48 | 570 | 0.76 | 36.7 | 8.5 |
| Graphitic carbon $A_2$ after: |  |  |  |  |  |  |
| Stage 1 | 1,165 | 6.17 | 550 | 1.13 | 54.4 | 5.5 |
| Stage 3 | 1,222 | 9.0 | 820 | 0.46 | 22.2 | 19.6 |
| Graphitic carbon $A_3$ after: |  |  |  |  |  |  |
| Stage 1 | 1,037 | 4.07 | 362 | 0.65 | 31.3 | 6.2 |
| Stage 2 | 1,344 | 6.18 | 550 | 0.85 | 40.8 | 5.8 |
| Stage 3 | 1,274 | 6.61 | 589 | 0.76 | 36.7 | 8.6 |

[1] Heat of adsorption of $nC_{32}$ to heat of adsorption of n-butanol.

The micro-analysis of the products obtained after stages 1 and 3 and are given below in Table 2.

TABLE 2

| Sample | Percent of— | | | |
|---|---|---|---|---|
| | C | H | S | Ash |
| Graphitic carbon A after stage 1 | 73.0 | 0.50 | 0.77 | 5.68 |
| Graphitic carbon A after stage 3 | 91.0 | 0.25 | <0.33 | 8.17 |

The excess material present is thought to be high boiling multi-ring aromatic compounds.

A further sample of the water/graphitic carbon slurry was taken and mixed with excess of a residual fuel oil. Virtually all the graphitic carbon was taken up by the fuel oil and this oily phase separated from the water. The free oil was removed and a product obtained comprising approximately 14.0% of the slurry.

This product was subjected to a three treatment stage, in stage 1 the product was refluxed with toluene for 16 hours, and the extracted product separated in stage 2 was heated in a vacuum at 550° C. and in stage 3 it was heated in a stream of hydrogen at 600° C.

This was repeated with further samples of graphitic carbon and these samples are referred to as graphitic carbons $B_1$, $B_2$ and $B_3$.

Another sample of the product obtained by removing the excess free oil from the graphitic carbon/fuel oil slurry was heated in a stream of hydrogen at a temperature of 600° C., this product is referred to as graphitic carbon E.

The heats of adsorption of n-dotriacontane and n-butanol from n-heptane were measured and the amount of graphitic carbon surface indicated thereby calculated.

Similar measurements were made on two commercial carbon blacks and on an oleophilic graphite made by grinding graphite in n-heptane for 8 hours the oleophilic graphite was also treated by the stage 2 and 3 treatments as above. These results are included for comparisons.

The results are shown below in Table 3.

EXAMPLE 2

A 160/95 waxy distillate derived from a Kuwait crude was mixed with graphite, prepared as described in Example 1 at a temperature of 25° C. and iso-octane, in proportions by weight of iso-octane to waxy distillate of 19 to 1 and graphite to waxy distillate of 2 to 1. The resulting material was thoroughly mixed and filtered. The properties of the filtrate (i.e. the unadsorbed material) are shown below together with those of the feedstock.

Filtrate:                              Feedstock
   Yield: 17% by weight of feedstock
   Pour point: 25° F.
   Viscosity index: 78                Solid at room temperature
   Sulphur: 1.5% _____ 3.22%
   Viscosity at 100° F.: 147.5 cs
   Viscosity at 210° F.: 12.38 cs _____ 14.98

EXAMPLE 3

A Libyan grade 30 waxy distillate was mixed with graphite and iso-octane in the same proportions and at the same temperature as in Example 2. The material was mixed and filtered. The properties of the filtrate and the feedstock are given below.

Filtrate:                             Feedstock
   Yield: 27.6% by wt. of feedstock
   Pour point: 35° F. _____ 45° F.
   Viscosity index: 98 _____ 101
   Sulphur content: 0.24
   Viscosity at 100° F.: 29.64 _____ 38.36
   Viscosity at 210° F.: 4.93 _____ 5.80

What we claim is:

1. A process for the separation of waxy hydrocarbons from a petroleum oil feed mixture boiling above 30° C. and comprising normal paraffin hydrocarbons having at least 4 carbon atoms per molecule in admixture with other hydrocarbons, which process comprises: adsorbing

TABLE 3

| | BET surface area, m²./grams | Heat of adsorption of $nC_{32}$ from n-heptane and surface area calculated therefrom | | Heat of adsorption of n-butanol from n-heptane and surface area calculated therefrom | | |
|---|---|---|---|---|---|---|
| | | Heat of ads., cals./grams | Surface area, grams | Heat of ads., cals./grams | Surface area, m²/grams | Ratio[1] |
| Graphitic carbon B¹ after: | | | | | | |
| Stage 1 | 670 | 5.0 | 445 | 0.17 | 8 | 29.4 |
| Stage 3 | | 9.2 | 819 | 0.17 | 8 | 54.1 |
| Graphitic carbon B₂ after: | | | | | | |
| Stage 1 | 1,122 | 8.61 | 749 | 0.04 | 2 | 215 |
| Stage 3 | | 10.9 | 970 | 0.04 | 2 | 275 |
| Graphitic carbon B₃ after: | | | | | | |
| Stage 1 | 1,245 | 5.85 | 521 | 0.41 | 19.4 | 14.4 |
| Stage 2 | 1,285 | 8.12 | 723 | 0.39 | 18.5 | 21.0 |
| Stage 3 | 1,290 | 6.30 | 560 | 0.57 | 28 | 11.0 |
| Graphitic carbon E | | 5.3 | 462 | 0.21 | 10 | 25.2 |
| Oleophilic graphite | 119 | 1.68 | 150 | 0.13 | 6.5 | 12.9 |
| Oleophilic graphite after: | | | | | | |
| Stage 2 | 134 | 1.51 | 134 | 0.26 | 12.7 | 4.6 |
| Stage 3 | 125 | 1.47 | 131 | 0.11 | 5.3 | 13.4 |
| Vulcan XC72R carbon black ex-Cobot | 201 | 0.71 | 63 | 0.38 | 10.6 | 1.87 |
| Raven "50" carbon black ex-Columbian | 124 | 0.21 | 13.6 | 0.43 | 12.1 | 0.48 |

[1] See footnote 1 bottom of Table 1.

It can be seen that the affinity for long chain paraffins and the surface areas of the graphitic product can be considerably increased by heating in and by treatment with a stream of hydrogen.

The surface area of the carbon product was determined by nitrogen adsorption, and the heat of adsorption of n-dotriacontane and n-butanol was determined using a Flow Micro-calorimeter as described in Chemistry and Industry, Mar. 20, 1965, pp. 482–489 using a 2% solution of the adsorbed liquids in n-heptane.

waxy hdrocarbons from the feed mixture by contacting the mixture in an adsorption step with a graphitic carban prepared by partially burning a hydrocarbon in oxygen or an oxygen containing gas at a temperature of at least 1000° C. so that not more than 10% by weight of the carbon in the hydrocarbon is released as elemental carbon, then treating the products of the partial combustion to separate and recover therefrom a graphitic carbon which is substantially non-hydrophilic and which has a surface area measured by nitrogen adsorption of at least 170 square meters per gram and a ratio of heat of adsorption of n-dotriacontane from n-heptane to the heat of adsorption of n-butanol from n-heptane of at least 3.5:1 and a heat of adsorption of n-dotriacontane from n-heptane of at least 1 calorie per gram, said contacting being carried out in the presence of a solvent in which waxy hydrocarbons adsorbed by the graphitic carbon are soluble; and removing the unadsorbed components from the graphitic carbon.

2. A process as claimed in claim 1 wherein the feed mixture is a petroleum fraction boiling in the range of 300 to 700° C.

3. A process as claimed in claim 2 wherein the petroleum fraction is a waxy raffinate used in the production of lubricating oil.

4. A process as claimed in claim 1 wherein the adsorbed components are subsequently recovered from the graphitic carbon in a desorption stage.

5. A process as claimed in claim 4 wherein both the adsorption and desorption stages of the process are carried out in the presence of solvents in which adsorbed and subsequently desorbed components are soluble.

6. A process as claimed in claim 5 wherein the solvent used in the adsorption stage is the same as that used in the desorption stage.

7. A process as claimed in claim 6 wherein the solvent is a mixture of hydrocarbons.

8. A process as claimed in claim 1 wherein a paraffin hydrocarbon having from 4 to 10 carbon atoms per molecule is adsorbed and a hydrocarbon solvent having 4 or 5 carbon atoms per molecule is used.

9. A process as claimed in claim 8 wherein the solvent is isopentane or isobutane.

10. A process as claimed in claim 6 wherein the solvent is liquefied ethane, liquefied ethylene, n-heptane or isooctane.

11. A process as claimed in claim 4 wherein the operating temperature for the desorption stage is from −50° to 200° C.

12. A process as claimed in claim 4 wherein the loading of the graphitic carbon with the adsorbed components is less than 200% based on the weight of the graphitic carbon.

13. A process as claimed in claim 12 wherein the loading of the graphitic carbon with the adsorbed components is in the range 10 to 100% based on the weight of the graphitic carbon.

14. A process as claimed in claim 5 wherein the feed mixture/solvent ratio is from 1 to 50% by weight.

15. A process as claimed in claim 1 wherein the process is carried out in a cyclic operation, the loading of the graphitic carbon per pass being from 20 to 100% based on the wt. of the graphitic carbon.

16. A process as claimed in claim 4 wherein the desorption is carried out at a temperature in the range 50 to 400° C.

References Cited
UNITED STATES PATENTS

| | | | |
|---|---|---|---|
| 3,338,815 | 8/1967 | Groszek | 208—310 |
| 3,513,089 | 5/1970 | Geach et al. | 208—28 |

HERBERT LEVINE, Primary Examiner

U.S. Cl. X.R.

208—26, 310; 260—674 SA, 676 AD; 423—445, 448

PO-1050
(5/69)

UNITED STATES PATENT OFFICE
CERTIFICATE OF CORRECTION

Patent No. 3,769,199            Dated    October 30, 1973

Inventor(s)   Aleksander Jerzy Groszek and Douglas Keith Nicholas

It is certified that error appears in the above-identified patent and that said Letters Patent are hereby corrected as shown below:

Column 1, line 48 change "100" to -- 1,000 --.

Column 2, line 1 change "no" to -- not --; line 31 change "redued" to -- reduced --.

Column 7, Table 3, in third subheading entitled "Surface area, grams" insert -- $m^2/$ -- before grams; change last number under that subheading from "13.6" to -- 18.6 --.

Column 8, line 13 after "25°F." insert -- _____ 95°F. --
line 17 change "cs" to -- cS --; line 18 change "cs" to -- cS --.

Signed and sealed this 2nd day of April 1974.

(SEAL)
Attest:

EDWARD M. FLETCHER, JR.            C. MARSHALL DANN
Attesting Officer                 Commissioner of Patents